W. PITTELKOW.
DUST SEPARATOR.
APPLICATION FILED DEC. 4, 1909.

980,832.

Patented Jan. 3, 1911.

2 SHEETS—SHEET 1.

Witnesses:
H. P. E. White
R. A. White

Inventor:
William Pittelkow,
By Rummler & Rummler,
Attys

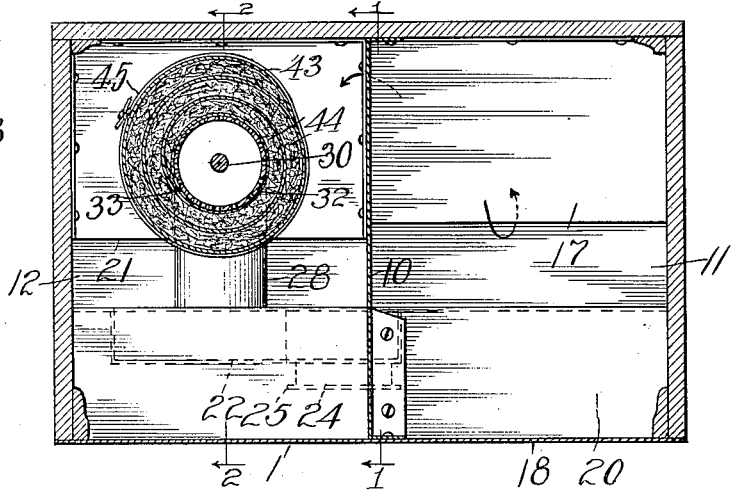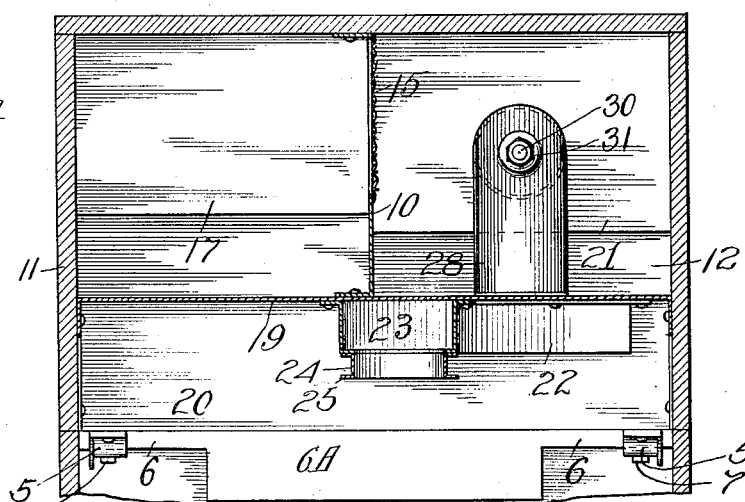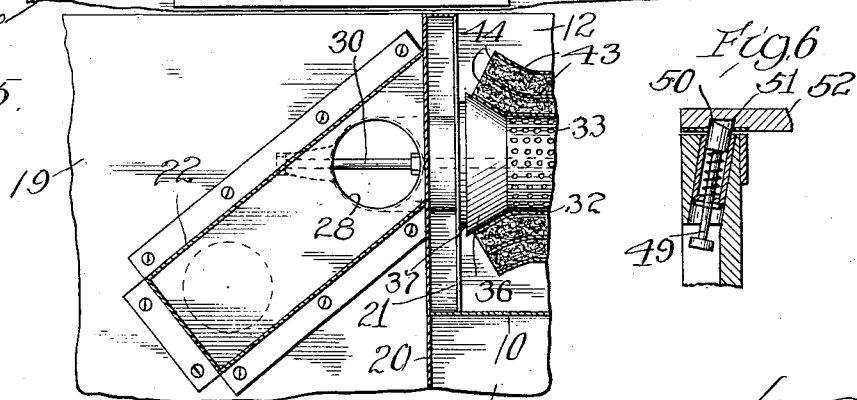

UNITED STATES PATENT OFFICE.

WILLIAM PITTELKOW, OF CHICAGO, ILLINOIS, ASSIGNOR, BY MESNE ASSIGNMENTS, TO ELECTRIC CLEANER COMPANY, OF CHICAGO, ILLINOIS, A CORPORATION OF ILLINOIS.

DUST-SEPARATOR.

980,832.  Specification of Letters Patent.  Patented Jan. 3, 1911.

Application filed December 4, 1909.  Serial No. 531,370.

*To all whom it may concern:*

Be it known that I, WILLIAM PITTELKOW, a citizen of the United States of America, and a resident of Chicago, county of Cook, State of Illinois, have invented certain new and useful Improvements in Dust-Separators, of which the following is a specification.

The main objects of this invention are to provide an improved form of dust separator particularly adapted for removing dirt and dust from the air in pneumatic cleaners, and of such construction that the filtering medium may be of a form so simple and inexpensive that it may be thrown away and replaced by another when it becomes clogged with dirt; and to provide an improved suction cleaner which is so constructed that the labor required to keep it clean and in working order is reduced to a minimum.

Figure 1:
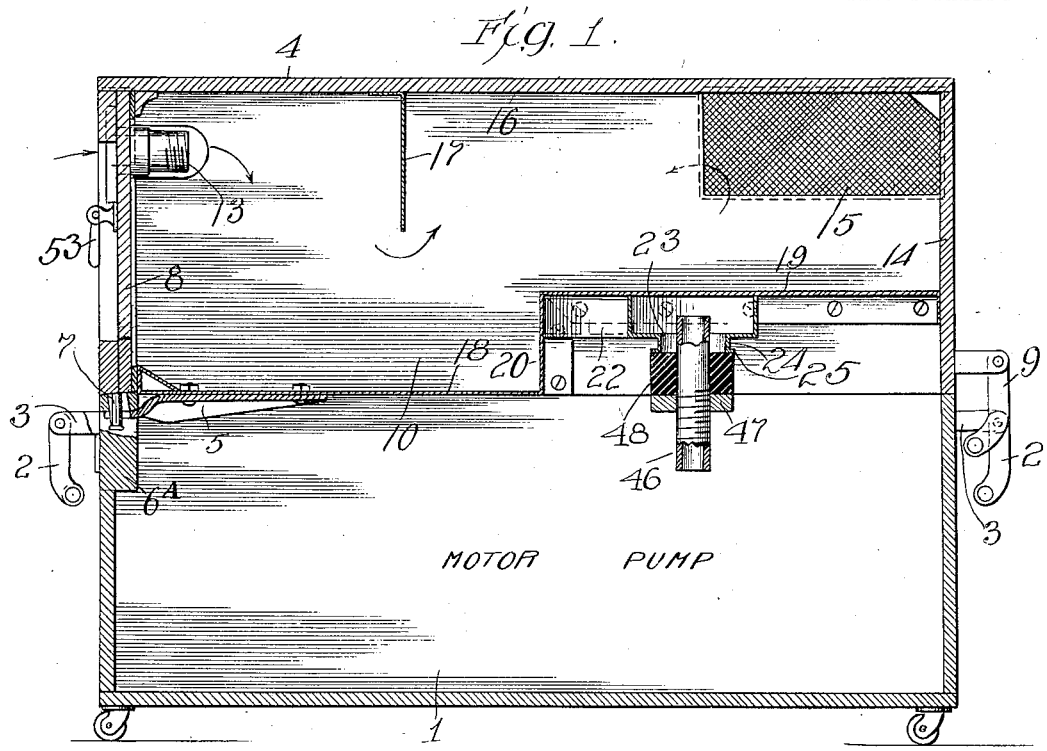
Figure 2:
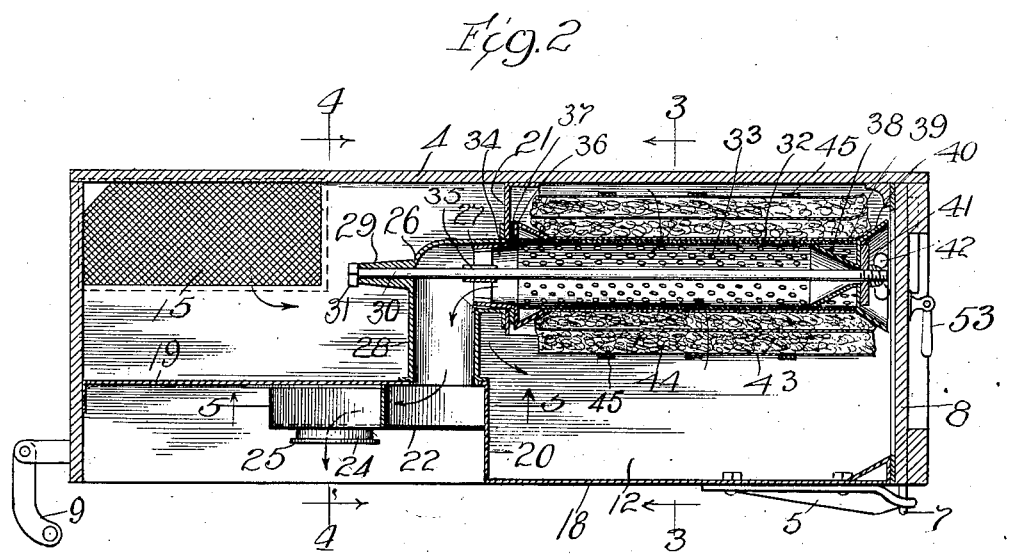

A specific construction embodying this invention is illustrated in the accompanying drawings, in which:

Figure 1 is a section taken on the line 1—1 of Fig. 3. Fig. 2 is a section taken on line 2—2 of Fig. 3. Fig. 3 is a section taken on line 3—3 of Fig. 2. Fig. 4 is a section taken on line 4—4 of Fig. 2. Fig. 5 is a fragmentary section taken on line 5—5 of Fig. 2, the filtering material being also shown in section. Fig. 6 is a fragmentary section of the door and lock for the cleaner casing.

In the construction shown, the casing 1, which contains the motor and pump (not shown), is preferably mounted upon casters to enable the device to be easily moved about, and is open at its top. The casing 1 is provided with U-shaped handles 2, which are pivoted to brackets 3 near the top of each end of the casing.

Seated on the top of the casing 1, and serving to close the same, is the cleaner casing 4, which, as shown in Fig. 1, is removably hinged on the casing 1 by means of straps or arms 5 which are secured to the bottom of the casing 4 and provided with downwardly offset ends adapted to engage beneath a ledge 6 on both sides of a strengthening block 6^A which is secured to the end of the casing 1. The block 6^A is provided with sockets adapted to receive dowel pins 7 carried on the bottom edge of the removable end wall or door 8 of the casing 4. On the end of the casing 4, opposite from said hinged connection, is a handle 9 similar to the handle 2 and adapted to have the adjacent handle 2 passed therethrough and turned downwardly to secure the casing 4 tightly upon the casing 1.

The casing 4 is provided with a central, longitudinal partition 10 which divides the casing into a receiving chamber 11 and a filtering chamber 12. A nipple 13 in the door 8 opens into the receiving chamber and is adapted to have the end of the suction pipe (not shown) connected therewith.

The partition 10 is provided at its end adjacent to the end 14 of the casing 4 with a screen 15 through which the air passes from the chamber 11 to the chamber 12. This screen is cut away at the upper rear corner, as shown in Fig. 1, to provide an air passage in case the screen becomes clogged with dirt.

Rigidly secured to the top 16 of the casing 4, and extending from the partition 10 to the side wall of the casing and downwardly for approximately one half of the depth of the chamber 11, is a baffle wall 17 which causes the dust-laden air current to flow downwardly when it enters the chamber 11, and then upwardly to pass through the screen 15. The turning of said current of air causes the heavier particles of dirt to be thrown out of the current and deposited in the bottom of the chamber.

The bottom 18 of the casing 4 is provided with an upwardly offset portion 19 extending from near the center of the casing to the end 14. The chamber 12 is provided near the end 20 of said offset portion with a transverse partition or baffle wall 21 which extends downwardly from the top of the casing to a point above the offset portion 19. Rigidly secured to the under side of said offset portion 19 is a sheet metal structure forming a channel or passage 22 which is provided in its bottom, near one end, with an outlet opening 23. Surrounding said opening is a collar or nipple 24 which has a flange 25 on its lower end. An elbow 26 forms a continuation of said passage, and has one arm 27 secured to the baffle wall 21, which has an opening registering with the end of the elbow. The other end 28 of the elbow extends downwardly through the offset portion 19 and opens into the channel 22 near the end 20 of said offset portion. The elbow 26 is provided with a brace 29 which is in axial alinement with the arm 27, and carried in said brace is a guide rod 30 which is provided at one end with a head 31 adapted to abut against the outer end of the brace 29, and the other end of said rod projects from the end of the elbow and extends into close proximity to the end wall 8. Supported on said guide rod 30 is the filter 32, which is provided with a central tubular screen 33 having a tapered nozzle or outlet 34 on its inner end adapted to fit tightly in the end of the arm 27 of the elbow. A guide collar 35 is rigidly secured in the nozzle and in axial alinement therewith, and is adapted to travel on the guide rod 30 and guide said nozzle into the elbow.

The rear end of the nozzle is provided with a peripheral shoulder 36, between which and the baffle wall 21 is secured a gasket 37 adapted to form a tight joint between the screen and the elbow. In the opposite end of the screen is a bell-shaped guide 38 having its smaller end directed toward the outer end of the screen and provided with a lateral flange or plate 39 which closes the end of the screen with the exception of a small aperture for the rod. Said plate is extended outwardly beyond the end of the screen to provide a shoulder 40.

On the outer end of the rod 30 is a washer 41 which abuts against the plate, and a wing-nut 42 is adapted to be secured on the end of the rod and set up against said washer to force the screen tightly into the end of the elbow.

The filtering screen comprises a perforated metal cylinder and a covering of alternate layers of cheese cloth or other porous fabric 43 and cotton batting 44, or other woolly material. The inner end of the fabric extends beyond the batting and is first wound onto the screen to prevent the loose fibers of cotton from being drawn through the meshes of the screen. The layer of cotton batting is preferably basted in position on one face of the fabric, and the two layers are together wound around the screen until as many thicknesses as desired have been placed. The outer end of the fabric also extends beyond the batting so that the fabric will cover the outer surface of the batting. This may be secured in place by means of strings or tapes 45 tied around the outside.

The inlet pipe 46 of the pump extends upwardly through the collar 24 and into the channel 22, and at a point below said collar it is provided with a flange 47.

Interposed between the collar 24 and said flange is a rubber gasket or washer 48 adapted to be compressed by the weight of the casing 4 when the casing is brought down onto the casing 1, The removable end or door 8 of the casing 4 is adapted to be secured in closed position by the spring-pressed bolt 49 which is carried in the top edge of the door and is provided with a beveled upper end 50 adapted to enter a socket 51 in the top 52 of the casing.

The operation of the device shown is as follows:—When the pump is operated, a current of air is drawn through the usual suction nozzle and flexible tube (not shown), and enters the chamber 11 at the inlet 13. The air current is deflected downwardly around the baffle wall 17, and as it turns upwardly around said wall, the heavier particles of dirt are thrown downwardly to the bottom of the chamber. The current then passes into the chamber 12 through the screen 15 which separates out any of the coarser dirt which has been carried beyond the baffle wall 17. After entering the chamber 12 the current passes beneath the baffle wall 21 and enters the filter 32. In passing through the layers of batting and fabric, the finer particles of dirt are filtered out from the air while the current passes into the space within the screen and thence through the elbow 26 and the channel 22 to the pump. When the walls of the filter become so clogged with dirt as to retard the passage of air therethrough, the door 8 is opened and the nut 42 is removed from the rod 30. The filter may then be withdrawn from the rod, and the layers of fabric and batting removed. The filtering material in the form shown is so inexpensive that, instead of cleaning it when filled with dirt, it may be thrown away and replaced by new material at a cost of a few cents. When the filter is replaced in the casing, the guide collar 35 running on the rod 30 centers the nozzle 34 in the elbow, and the guide 38 brings the outer end of the screen into position, thus insuring proper registering of the parts. The filter is finally secured in place by the nut 42, and after the closing of the door 8 the device is again ready for operation. The dirt which is separated from the current before it reaches the filter may be removed from the casing through the door 8.

The method of mounting the upper casing to the lower casing affords easy access to the lower casing to inspect or care for the pump and motor.

Although but one specific embodiment of this invention is herein shown and described, it will be understood that some of the details of the construction shown may be altered or omitted, within the scope of the following claims, without departing from the spirit of this invention.

I claim:—

1. A pneumatic cleaner, comprising a casing having an inlet and an outlet therein, a pipe in the casing connected with said outlet, a guide rod projecting from the inner end of the pipe, a screen slidably mounted on the rod and connected with the pipe, and a layer of fibrous material wound on the screen.

2. A pneumatic cleaner, comprising a casing, means providing a passage in the casing, a guide rod supported in said means, a screen supported on the rod and connected with said passage, and alternately arranged layers of fabric and woolly material wound on the screen.

3. A pneumatic cleaner, comprising a casing, means in the casing providing an exit passage, a guide rod projecting from the inner end of the passage, a screen mounted on the rod, a nozzle on the screen affording a tight joint with the inner end of the passage, means in the screen adapted to center it on the rod, and a plurality of layers of filtering material wound on the screen.

4. A pneumatic cleaner, comprising a casing, a vertical partition dividing the casing into two compartments, one having an inlet and the other an outlet, a screened opening near an upper corner of the partition, a baffle wall in said one compartment spaced away from said inlet, under which the current of air must pass on its way to said opening, a filter in the other compartment, and means providing a passage connecting the filter with the outlet.

5. A pneumatic cleaner, comprising a casing, a vertical partition dividing the casing into two compartments, a screened opening in the partition near an upper corner of said partition, affording communication between the compartments, means providing an inlet into one compartment at the end thereof most distant from said screened opening, a baffle wall extending downward from the upper wall of said one compartment, a filter in the other compartment and connected with the outlet, and means supporting the filter out of contact with the walls of the compartment.

6. A pneumatic cleaner, comprising a casing, a partition dividing the casing into compartments, an inlet in one compartment, a baffle wall depending from the top of the compartment to a point below the inlet, a screen in the partition on the side of the baffle wall opposite from the inlet, an elbow connected with the outlet, a guide rod supported on the elbow, and a filter mounted on said guide rod.

7. A pneumatic cleaner, comprising a casing having an upwardly offset portion in its bottom, a partition dividing the casing into compartments, a screen in the partition, means providing a channel beneath the offset portion and opening into one of the compartments, an elbow in the compartment and connected with said channel, a filter screen connected with the elbow, filtering means wound on the screen, a pump inlet pipe projecting into the channel, and means providing a tight joint between the pump inlet and the channel.

8. A pneumatic cleaner, comprising a lower casing adapted to contain a pump, a cleaner casing mounted on the lower casing, means adapted to secure the casings together, a door in the cleaner casing, a partition dividing the cleaner casing into compartments, a baffle wall in each compartment, a screen in the partition, a filter screen supported in one compartment, alternate layers of fabric and woolly material wound on the filter screen, means providing a passage from the filter screen to the lower casing, a pump inlet pipe in the lower casing, and means providing a tight joint between the pipe and passage.

9. A pneumatic cleaner, comprising a casing having an air outlet, a guide rod secured in a central position in said outlet and extending inward of the casing from said outlet, a perforated hollow screen having at one end a guide part which is adapted to receive said rod and having at its other end a funnel-shaped guide part adapted to center said other end on said rod, said one end of said screen being adapted to have tight fit with said outlet, and means on said rod for securing said screen in position.

10. A pneumatic cleaner, comprising a casing having an air outlet, a guide rod secured in a central position in said outlet and extending inward of the casing from said outlet, a perforated hollow screen having at one end a guide part which is adapted to receive said rod and having at its other end a funnel-shaped guide part adapted to center said other end on said rod, said one end of said screen being adapted to have tight fit with said outlet, means on said rod for securing said screen in position, and a sheet of dust filtering material extending across the perforations in said screen.

11. A pneumatic cleaner, comprising a casing having an air outlet, a guide rod secured in a central position in said outlet and extending inward of the casing from said outlet, a perforated hollow screen having at one end a guide part which is open at one side and adapted to receive said rod and having at its other end a funnel-shaped guide part adapted to center said other end on said rod, said one end of said screen being adapted to have tight fit with said outlet, means on said rod for securing said screen in position, and alternate layers of fabric and woolly material wrapped around said screen to cover the perforations therein and filter the air passing through them.

12. In a pneumatic cleaner, the combination of a casing, a door in one side thereof, said casing having therein an outlet located within the casing remote from the door, a hollow filtering screen having one end adapted for having fitting engagement with said outlet, a guide extending from said outlet toward said door, and means on said screen coacting with said guide for directing said screen into position for accurately registering with said outlet.

Signed at Chicago this 30th day of November, 1909.

WILLIAM PITTELKOW.

Witnesses:
E. A. RUMMLER,
MARY M. DILLMAN.